United States Patent [19]

Ward et al.

[11] Patent Number: 5,677,411

[45] Date of Patent: Oct. 14, 1997

[54] HEAT CURABLE ELASTOMERIC COMPOSITIONS

[75] Inventors: Brian J. Ward, Valley Falls; Robert A. Smith, Clifton Park; Richard A. Striker, Rensselaer, all of N.Y.

[73] Assignee: General Electric Company, Pittsfield, Mass.

[21] Appl. No.: 704,038

[22] Filed: Aug. 28, 1996

Related U.S. Application Data

[63] Continuation of Ser. No. 497,631, Jun. 30, 1995, abandoned.

[51] Int. Cl.$^6$ .................................................. C08G 77/08
[52] U.S. Cl. ................... 528/15; 528/17; 528/18; 524/265; 524/398; 524/730; 524/731; 524/783
[58] Field of Search ................. 528/15, 17, 18; 524/730, 731, 783, 265, 398

[56] References Cited

U.S. PATENT DOCUMENTS

| | | |
|---|---|---|
| 2,938,009 | 5/1960 | Lucas . |
| 3,024,126 | 3/1962 | Brown . |
| 3,159,601 | 12/1964 | Ashby . |
| 3,159,662 | 12/1964 | Ashby . |
| 3,220,972 | 11/1965 | Lamoreaux . |
| 3,284,406 | 11/1966 | Nelson ........................ 528/43 |
| 3,344,111 | 9/1967 | Chalk . |
| 3,436,366 | 4/1969 | Modic . |
| 3,445,420 | 5/1969 | Kookootsedes et al. . |
| 3,629,228 | 12/1971 | Hartlein et al. ............. 528/17 |
| 3,635,743 | 1/1972 | Smith . |
| 3,689,454 | 9/1972 | Smith et al. ................. 528/17 |
| 3,715,334 | 2/1973 | Karstedt . |
| 3,775,452 | 11/1973 | Karstedt . |
| 3,814,730 | 6/1974 | Karstedt . |
| 3,847,848 | 11/1974 | Beers . |
| 3,884,866 | 5/1975 | Jeram et al. . |
| 3,957,713 | 5/1976 | Jeram et al. . |
| 4,043,953 | 8/1977 | Chang et al. . |
| 4,162,243 | 7/1979 | Lee et al. . |
| 4,221,693 | 9/1980 | Getson et al. ............... 528/17 |
| 4,256,870 | 3/1981 | Eckberg . |
| 4,427,801 | 1/1984 | Sweet . |
| 5,380,788 | 1/1995 | Stein et al. ................. 524/730 |
| 5,504,174 | 4/1996 | Onishi ........................ 528/17 |

FOREIGN PATENT DOCUMENTS

| | | |
|---|---|---|
| 69926 | 1/1983 | European Pat. Off. . |
| 0120115A | 10/1984 | European Pat. Off. . |
| 0192275A | 8/1986 | European Pat. Off. . |
| 322196 | 6/1989 | European Pat. Off. . |
| 0444662A | 9/1991 | European Pat. Off. . |
| 0604086A | 6/1994 | European Pat. Off. . |
| 0661335A | 7/1995 | European Pat. Off. . |
| 0704492 A | 4/1996 | European Pat. Off. . |
| 1089809 | 11/1967 | United Kingdom . |

OTHER PUBLICATIONS

Chemical Abstracts 108:221321 and Azerb Khim Zh (1986), (5), 40–4 see Abstract.
Chemical Abstracts 97:24703 and FR 2487842 A (Institute Of Heterocyclic Compounds) See Abstract.
Chemical Abstracts 91:38881 and Azerb Khim Zh (1978) (5) 42–3 see Abstract.
Chemical Abstracts 119:160037 and J Org. Chem (1993) 58(17) 4646–55 see Abstract.
Chemical Abstracts 117:8707 and JP 03232840 A2 (Asahi Chemical Industry Co) See Abstract.
Chemical Abstract 109:150229 and JP 63096144 A2 (Agency Of Industrial Sciences And Technology) see abstract.

Primary Examiner—Melvyn I. Marquis
Attorney, Agent, or Firm—Kenneth S Wheelock

[57] ABSTRACT

Secondary contact adhesion or self-bonding in cured liquid injection molding silicone compositions is reduced by the inclusion in the composition of an inhibitor compound selected from the group consisting of phenyl fluids, titanate esters, and silicate esters.

11 Claims, No Drawings

HEAT CURABLE ELASTOMERIC COMPOSITIONS

This is a continuation of application Ser. No. 08/497,631 filed on Jun. 30, 1995, now abandoned.

FIELD OF THE INVENTION

The present invention relates to heat curable elastomeric silicone compositions suitable for use in liquid injection molding to produce articles of manufacture. The present invention further relates to such compositions that when formed as an article of manufacture and cured will not form any additional, adhesive bond to other devices or surfaces which said composition in the form of an article of manufacture may contact.

BACKGROUND OF THE INVENTION

Note: In the present specification, the word resin has been used with two meanings customary in the art. The first meaning refers to a composition that is injected into a liquid injection molding apparatus and is very broad with respect to the chemical composition of its component parts. The second meaning is more specific to the chemistry of organopolysiloxanes and related silicone polymers, referring there to MQ, MDQ, MTQ, or MDTQ and similar compositions that may or may not comprise a precursor feedstock to a liquid injection molding apparatus.

Liquid injection moldable organopolysiloxane compositions are known and used. A problem with all such compositions is that the hardness, tensile strength, elongation and tear are so interdependent among themselves and also with the viscosity of the uncured liquid precursor that it is difficult to improve one property without deleterious effects on the other properties. Additionally, the kinetics and thermochemistry of the liquid injection molding process and the compositions used therewith have been such that only small lightweight articles of manufacture could be made by the techniques of liquid injection molding because of the speed with which the liquid precursor cures once it has been injected into the mold.

Liquid injection molding organopolysiloxane compositions, typically known as addition curable silicone compositions, are usually provided as two components that are mixed immediately prior to use. Both components contain alkenyl polymers, fillers, and in some cases resins. The first component contains a platinum catalyst while the second component contains a hydride cross linker and cure inhibitors. The two components are mixed immediately prior to use in the injection molding apparatus. In addition to providing a so-called formulation pot-life, the inhibitor must prevent curing of the curable composition until the mold is completely filled. Once the mold is completely filled the inhibitor must then allow for a rapid cure of the curable or polymerizable composition in order to ensure a short cycle life.

U.S. Pat. Nos. 3,884,866 and 3,957,713 describe high strength addition cured compositions suitable for low pressure liquid injection molding. These compositions comprise a first component containing a high viscosity vinyl end-stopped organopolysiloxane, a low viscosity vinyl containing organopolysiloxane, filler, and platinum catalyst which is cured by mixing with a second component containing a hydrogen silicone composition. This composition has a low durometer, ca 20–35 Shore A, and, moreover it is difficult to increase the durometer or hardness without adversely affecting other properties.

U.S. Pat. No. 4,162,243 discloses compositions similar to the previously referenced compositions but they contain as the most important distinction, fumed silica that has been treated with hexamethyldisilazane and tetramethyldivinyldisilazane. The compositions of the '243 patent cure to elastomers having high hardness with good retention of other properties including strength, elongation, and tear in addition to having a low viscosity in the uncured state.

U.S. Pat. No. 4,427,801 extends the teaching of the '243 patent by incorporating a $MM^{Vi}Q$ resin in addition to the vinyl containing treated fumed silica. This produces elastomers having even a higher hardness and tear strength but has the disadvantage of higher compression set and lower Bashore resilience.

The manufacturing technique of liquid injection molding typically has been limited to small parts, usually materials weighing less than from about 5 to about 50 grams. Advances in technology are allowing liquid injection molded parts to become larger. Larger parts require larger molds. Larger molds require more time to fill the mold with resin and thus curing must be inhibited for longer times in order to allow the mold to fill before cure may be initiated.

When not used in liquid injection molding, addition curable silicone compositions may be applied to various substrates for various purposes. For example, such compositions may be applied to various synthetic fiber substrates to impart enhanced physical properties to the resulting laminate so that the laminate may be used for such purposes as gaskets, radiator hoses, and the like. Further, for various hard substrates, such as metals or glass and the like, so as to impart an improved weatherability to the resulting laminated product.

Sometimes it is necessary to apply addition curable silicone compositions to heat sensitive substrates, e.g. polyolefins. Coating compositions which require a a high temperature in order to cure are generally not compatible with heat sensitive substrates. Therefore, it becomes desirable to provide an addition curable composition that cures at lower temperatures in a reasonable period of time, e.g. about 2–3 hours.

Frequently, when an addition curable silicone composition is applied to various substrates, it is often necessary to use a primer, that is a primer is applied to the substrate and then the silicone rubber is applied thereover and cured onto the substrate. In many cases, if a silicone rubber composition is applied to a substrate without a primer, the bond between the silicone rubber and the primer is not as good as would be desired. With reference to the bonding between a silicone rubber and a substrate there are two types of bonding that require elaboration, cohesive and adhesive bonding. Adhesive failure occurs when the bond between the substrate and the rubber is not sufficiently strong such that when bond failure occurs, the silicone rubber layer separates from the substrate at the point where the two layers meet, that is the bond between the silicone rubber layer and the substrate separates before there is an material failure either of the rubber or the substrate. Cohesive failure occurs when the silicone rubber layer or the substrate rupture before the bond between the silicone rubber and the substrate fails. Depending on the specific applications involved adhesive properties of the silicone rubber may be minimized or maximized.

Solventless addition curable silicone rubber compositions which combine a critical SiH:SiVinyl molar ratio with an adhesion promoter selected from certain silylfumarates, silylmaleates, and silylmaleimides form rubbers that cure at relatively low temperatures and provide superior adhesives properties with excellent physical and lap shear adhesive properties. One advantage of such compositions is that they adhere to various substrates without the use of primers.

The use of silyl fumarate and silylmaleate compounds as adhesion promoters in silicone compositions is known in the art. Reference is made for example, to U.S. Pat. No. 3,941, 741, which discloses the use of such compounds as a self-bonding additive in a heat curable silicone rubber composition. Reference is further made to U.S. Pat. Nos. 4,273,698; 4,308,372; and 4,395,507 which disclose the use of silyl maleate, fumarate, or succinate as an adhesion promoter in room temperature curable silicone compositions. Similarly these compounds may be used for similar purposes in addition curable silicone compositions, U.S. Pat. No. 4,891,407.

The '407 patent is directed to a composition having an interpenetrating matrices containing two polymer networks. The first of these is any polymer that maybe stretched, drawn or otherwise expanded so as to obtain a microstructure characterized by nodes interconnected by very small fibrils and is preferably polytetrafluoroethylene. The second polymer network may be an addition curable silicone composition containing an alkenyl containing polydiorganosiloxane, an organohydrogenpolysiloxane, an organic peroxide or a precious metal containing catalyst and optionally a reinforcing organopolysiloxane resins, and extending and/or reinforcing fillers. This addition curable composition preferably contains an adhesion promoter which may be any of the maleate and fumarate-functional silanes as disclosed in U.S. Pat. No. 3,759,968. The cure temperature of this material is in a range varying from 200°–300° F. with a cure time of about 2 hours. Addition of a cure inhibitor may be used to prevent curing at temperatures below about 100° C.

SUMMARY OF THE INVENTION

There is provided in the instant invention a liquid injection molding composition containing curable silicone compounds comprising a self-bonding inhibitor compound selected from the group consisting of:

1) phenyl fluids, i.e. silicones having the general formula: MDD'M, where $M=(R^1)_3Si$ with $R^1$ selected from the group of one to twelve carbon atom hydrocarbon radicals, $D=R^1R^2SiO_{2/2}$ with $R^1$ as previously defined and $R^2$ selected from the group of one to twelve carbon hydrocarbon radicals, and $D'=R^1ArSiO_{2/2}$ with $R^1$ as previously defined and Ar selected from the group of 6 to 20 carbon atom aromatic hydrocarbon radicals;

2) titanate esters of the formula:

$Ti(OR^4)_4$ where $R^4$ is selected from the group of 1 to 20 carbon atom hydrocarbon radicals which includes alkyl radicals, aryl radicals, and alkylaryl radicals, where each of the four $R^4$ groups may be independently selected; and 3) silicate esters of the formula:

$ArSi(OR^4)_3$, where Ar and $R^4$ are as previously defined. There is further provided by the present invention cured compositions which exhibit reduced self-bonding and articles of manufacture which exhibit reduced self-bonding.

DETAILED DESCRIPTION OF THE INVENTION

There is provided in the present invention a liquid injection molding organopolysiloxane composition, as a member of a class of moldable and curable resins, combining low viscosity, high strength, good elongation with exceptionally good hardness and tear strength which do not further adhesively bond after curing to any other surfaces or articles with which they may be in contact. The composition of the present invention is based on the discovery that an adhesive addition curable silicone rubber composition may be modified for use in liquid injection molding and further since adhesive properties can cause problems with mold release and self-bonding after such an article is molded, by incorporating post-cure self-bonding inhibitors. Such a low viscosity organopolysiloxane composition comprises:

(A) 100 parts by weight of an alkenyl, preferably vinyl containing polyorganosiloxane component comprising:

(1) 70 to 98 parts by weight of a linear high viscosity alkenyl or vinyl end-stopped organopolysiloxane having no more than 25 mole percent of phenyl radicals and having a viscosity of from about 2,000 to about 1,000,000 centipoise at 25° C., (2) 1 to 15 parts by weight of a linear low viscosity organopolysiloxane having at least one terminal alkenyl group per molecule, having an alkenyl or vinyl content that may vary from 0.01 mole percent alkenyl or vinyl to 60 mole percent alkenyl or vinyl, having a viscosity that varies from 50 to about 5,000 centipoise at 25° C. and having no more than 25 mole percent phenyl radicals, and, (3) 1 to 15 parts by weight of an alkenyl or vinyl on chain organopolysiloxane having from about 0.1 to about 25 mole percent alkenyl or vinyl, having a viscosity that varies from about 50 to 100,000 centipoise at 25° C. and having no more than about 25 mole percent phenyl radicals;

(B) from about 5 to about 70 parts by weight of a filler, where the total weight of (A) components and (B) ranges from 105 to 170 parts by weight;

(C) from about 0.1 to 50 parts per million of the total organopolysiloxane composition of a platinum catalyst;

(D) from about 0.1 to 10 parts by weight a SiH composition selected from the class consisting of hydrogen containing silanes and hydrogen containing organopolysiloxane, where the total weight of (A)=(B)+(C)+(D) ranges from 105.11 to 180.11 parts by weight;

(E) optionally, from about 0.1 to about 6.0 parts by weight a hydroxy containing organopolysiloxane fluid or resin having a viscosity ranging from about 5 to about 100 centipoise at 25° C.; and (F) from about 0.001 to about 1.0 parts by weight per weight of the total liquid injection molding fluid of an injection molding inhibitor compound or compounds, said injection molding inhibitor compound(s) selected from the group consisting of the mono- and di- alkynyl substituted derivatives of maleic acid said compound or compounds having the formula:

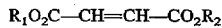

wherein $R_1$ has generally those known in the art but preferably selected from the class of liquid injection molding inhibitors having the formula:

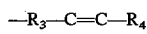

wherein $R_3$ is selected from the group of divalent hydrocarbon radicals consisting of linear or branched alkyl radicals having from 1 to about 10 carbon atoms, linear or branched alkenyl radicals having from 1 to about 10 carbon atoms, linear or branched alkynyl radicals having from 1 to about 10 carbon atoms, cycloalklyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 1 to about 10 carbon atoms, chlorinated linear or branched alkenyl radicals having from 1 to about 10 carbon atoms, brominated linear or branched alkenyl radicals having from 1 to about 10 carbon atoms, fluorinated linear or branched alkynyl radicals having from 1 to about 10 carbon atoms, chlorinated linear or branched alkynyl radicals having from 1 to about 10 carbon atoms, brominated linear or branched alkynyl radicals having from 1 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms, aryl radicals, linear or branched alkyl aryl radicals, fluorinated aryl radicals, chlorinated aryl radicals, brominated aryl radicals; fluorinated linear or branched alkyl-, alkenyl-,or alkynyl aryl radicals; chlorinated linear or branched alkyl-, alkenyl-, or alkynyl aryl radicals; and brominated linear or branched alkyl-, alkenyl-, or alkynyl aryl radicals; and wherein R4 is selected from the group of monovalent radicals consisting of hydrogen, linear or branched alkyl radicals having from 1 to about 10 carbon atoms, linear or branched alkenyl radicals having from 1 to about 10 carbon atoms, linear or branched alkynyl radicals having from 1 to about 10 carbon atoms, cycloalklyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 1 to about 10 carbon atoms, chlorinated linear or branched alkenyl radicals having from 1 to about 10 carbon atoms, brominated linear or branched alkenyl radicals having from 1 to about 10 carbon atoms, fluorinated linear or branched alkynyl radicals having from 1 to about 10 carbon atoms, chlorinated linear or branched alkynyl radicals having from 1 to about 10 carbon atoms, brominated linear or branched alkynyl radicals having from 1 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms aryl radicals, linear or branched alkyl aryl radicals, fluorinated aryl radicals, chlorinated aryl radicals, brominated aryl radicals; fluorinated linear or branched alkyl-, alkenyl-,or alkynyl aryl radicals; chlorinated linear or branched alkyl-, alkenyl-, or alkynyl aryl radicals; brominated linear or branched alkyl-, alkenyl-, or alkynyl aryl radicals; and triorganosilyl radicals and wherein $R_2$ may be $R_1$ or selected from the group consisting of hydrogen, triorganosilyl radicals, and siloxanes wherein the structural geometry of the compound around the double bond may be either cis or trans.

(G) from about 0.1 parts by weight to about 1.5 parts by weight of the final composition of bis (trimethoxysilylpropyl)fumarate or bis (trimethoxysilylpropyl)maleate as a adhesion promoter; and (H) from about 0.2 parts by weight to about 6.0 parts by weight parts by weight of the final composition of a self bonding inhibitor that prevents post cure bonding to contact surfaces where such self-bonding inhibitor is selected from the group of compounds consisting of:

1) phenyl fluids, i.e. silicones having the general formula: MDD'M, where $M=(R^1)_3Si$ with $R^1$ selected from the group of one to twelve carbon atom hydrocarbon radicals, $D=R^1R^2SiO_{2/2}$ with $R^1$ as previously defined and $R^2$ selected from the group of one to twelve carbon hydrocarbon radicals, and $D'=R^1ArSiO_{2/2}$ with $R^1$ as previously defined and Ar selected from the group of 6 to 20 carbon atom aromatic hydrocarbon radicals, preferably the viscosity of these phenyl fluids ranges from about 20 to about 1,000 centipoise at 25° C.;

2) titanate esters, i.e. hydrocarbyloxy titanates of the formula:

$Ti(OR^4)_4$ where $R^4$ is selected from the group of 1 to 20 carbon atom hydrocarbon radicals which includes alkyl radicals, aryl radicals, and alkylaryl radicals, it is to be noted that the mixed esters where each of the $R^4$ groups are selected from the possible substituents are included in this definition; and 3) silicate esters of the formula:

$ArSi(OR^4)_3$, where Ar and $R^4$ are as previously defined; and where the weight of the composition as a sum of the components (A) through (H) varies from about 105.511 parts by weight to about 194.61 parts by weight, This composition may be either cured to an elastomer at room temperature for several hours or may be cured at elevated temperatures, such as, for example, 200° C. for 10 seconds. In one embodiment, the above composition is a two-component composition where the first component, contains at least all of ingredient (C), and the second component, contains all of ingredient (D) and the inhibitor compound(s) F; and one or the other contains the additional components (G) and (H).

The linear high viscosity alkenyl or vinyl end-stopped organopolysiloxane, A(1), has no more than 25 mole percent of phenyl radicals and a viscosity of from about 2,000 to about 1,000,000 centipoise 25° C., preferably from about 10,000 to about 500,000 at 25° C. These high viscosity organopolysiloxanes may be represented by the general formula:

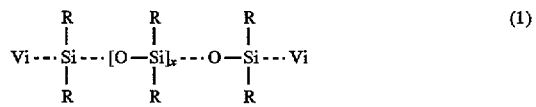  (1)

where Vi stands for alkenyl or vinyl, R is selected from the group consisting of monovalent hydrocarbon radicals and halogenated monovalent hydrocarbon radicals having up to about 20 carbon atoms, and x may vary from about 100 to about 10,000 or even higher, preferably ranging from about 500 to about 2,000. Suitable high viscosity organopolysiloxanes are disclosed in U.S. Pat. No. 3,884,866 hereby incorporated by reference.

The linear low viscosity organopolysiloxane, A(2), has at least one terminal alkenyl or vinyl group per molecule, an alkenyl or vinyl content that may vary from about 0.01 mole percent vinyl to about 60 mole per cent vinyl, preferably from about 0.05 to about 10 mole percent alkenyl or vinyl, a viscosity that varies from about 50 to about 5,000 centipoise at 25° C., preferably from about 50 to 1,000 centipoise at 25° C.; and no more than about 25 mole percent phenyl radicals. These low viscosity organopolysiloxanes may be represented by the general formula:

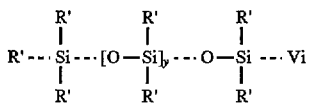

wherein R' is selected from the group consisting of monovalent hydrocarbon radicals having up to about 20 carbon atoms, halogenated monovalent hydrocarbon radicals having up to about 20 carbon atoms, and alkenyl or vinyl, Vi is alkenyl or vinyl, and y may vary from about 1 to about 750. Suitable low viscosity organopolysiloxanes are disclosed in U.S. Pat. No. 3,884,886 hereby incorporated by reference.

The alkenyl or vinyl on chain organopolysiloxanes, A(3), is important to obtaining the desired properties. Suitable alkenyl or vinyl on chain organopolysiloxanes have from about 0.1 to about 25 mole percent alkenyl or vinyl and preferably from about 0.2 to about 5 mole percent alkenyl or vinyl, a viscosity that varies from about 50 to about 100,000 centipoise at 25° C., preferably from about 100 to about 100,000 centipoise at 25° C., and no more than about 25 mole percent phenyl radicals. These organopolysiloxanes may be characterized as copolymers of (I) siloxane units having the formula:

$$R_a R_b^2 SiO_{(4-a-b/2)} \qquad (3)$$

wherein R is selected from the group consisting of monovalent hydrocarbon radicals and halogenated monovalent hydrocarbon radicals having up to about 20 carbon atoms, $R^2$ is an olefinic hydrocarbon radical attached to silicon by a C-Si linkage, and generally contains from 1 to about 20 aliphatic carbons, either straight chain or branched, and preferably from 1 to about 12 carbon atoms linked by multiple bonds, with the stoichiometric subscript a ranging from a value of 0 to about 2 inclusive, and the sum of the stoichiometric subscripts a and b ranges from about 0.8 to about 3.0 inclusive, and (II) organopolysiloxane units having the structural formula:

$$R_c SiO_{(4-c)/2} \qquad (4)$$

wherein R is selected from the group consisting of monovalent hydrocarbon radicals and halogenated monovalent hydrocarbon radicals having up to about 20 carbon atoms, and the stoichiometric coefficient c ranges in value from about 0.85 to about 2.5, inclusive. $R^2$ may be for example, allyl, methallyl, butenyl, pentenyl, hexenyl, heptenyl, octenyl, ethenyl, and the like, but is preferably vinyl. The copolymer of (I) and (II) generally contains from about 0.5 to 99.5 mole percent of the compound of B formula (3) above and from about 0.5 to 99.5 mole percent of the compound of formula (4) above. The preparation of these copolymers is well known in the art, as is taught in U.S. Pat. Nos. 3,436,366 and 3,344,111 hereby incorporated by reference.

Preferred alkenyl or vinyl on chain organopolysiloxanes are linear and have the general formula:

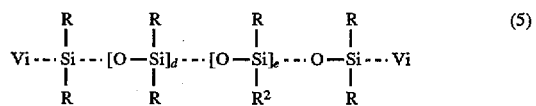

wherein R is selected from the group consisting of monovalent hydrocarbon radicals and halogenated monovalent hydrocarbon radicals having up to about 20 carbon atoms, $R^2$ is an olefinic hydrocarbon radical attached to silicon by a C-Si linkage, and generally contains from 1 to about 20 aliphatic carbons, either straight chain or branched, and preferably from 1 to about 12 carbon atoms linked by multiple bonds, and d and e are positive integers such that the polymer contains up to approximately 20 mole percent $R^2$. Vi is alkenyl or vinyl. Preferably $R^2$ is vinyl but may also be alkenyl, then the polymer contains from 0.05 to 10 mole percent $R^2$, and the viscosity ranges from about 300 to about 1000 at 25° C.

As previously recited, R is selected from the group consisting of monovalent hydrocarbon radicals and halogenated monovalent hydrocarbon radicals having up to about 20 carbon atoms, that is radicals normally associated as substituent groups for organopolysiloxanes. Thus the radical R may be selected from the class consisting of mononuclear and binuclear aryl radicals such as phenyl, tolyl, xylyl, benzyl, naphthyl, alkylnaphthyl and the like; halogenated mononuclear and binuclear aryl radicals such as chlorophenyl, chloronaphthyl and the like; mononuclear aryl lower alkyl radicals having from 0 to 8 carbon atoms per alkyl groups such as benzyl, phenyl and the like; lower alkyl radicals having from 1 to, 8 carbon atoms such as methyl, ethyl propyl, butyl, pentyl, hexyl, heptyl, octyl and the like either as straight or branched chain alkyl substituents, lower alkenyl radicals having from 2 to 8 carbon atoms such as vinyl, allyl, and 1-propenyl; halo lower alkyl radicals having from 1 to 8 carbon atoms such as chloropropyl, trifluoropropyl, and cycloalkyl radicals such as cyclobutyl, cyclopentyl and cyclohexyl. Though R may be any of the above, persons skilled in the art will readily recognize that not every R can be a high molecular weight radical and that R should be chosen so as to not adversely affect the vinyl group reactions. Preferably R is a lower alkyl radical of 1 to 8 carbon atoms, such as methyl, ethyl, and phenyl trifluoropropyl. More particularly, R, is at least 70 percent by number methyl.

The SiH composition, (D), serves as a cross linking agent and may be selected from the class consisting of hydrogen containing silanes and hydrogen containing organopolysiloxanes. Hydrogen containing organopolysiloxane can be characterized as copolymers containing at least one unit per molecule having the formula:

$$R_f H_g SiO_{(4-f-g)/2} \qquad (6)$$

where the remaining siloxane units in the organopolysiloxane are within the scope of formula (4) above, with the notable exception that the R of formula (4) as well as the R herein should be saturated, f has a value ranging from 0 to about 2, inclusive; and the sum of f and g ranges from about 0.8 to about 3.0. The viscosity of the hydrogen containing organopolysiloxane should range from about 5 to about 100 centipoise at 25° C.

Included with the hydrogen containing organopolysiloxane described above are MQ resins having units of, for example, $M(R)_2$, $SiO_{1/2}$ and $SiO_2$. Also included therein are MDQ, MTQ, MDT, and MTQ resins with hydrogen substitution. Thus copolymer generally contains from 0.5 to 99.5 mole percent of the units of formula (6) and from 99.5 mole percent of the units of formula (4).

The compounds, oligomers, resins or fluids designated MQ, MDQ, MTQ, MDT, and MT refer to the nomenclature explained in the research monograph by H. A. Liebhafsky, "Silicones Under the Monogram," published by Wiley—Interscience division of John Wiley and Sons, New York (publication date 1978) at pages 99 and following. In the context of the present invention, substitutional isomerization such as M' being different from M but functioning as an "M" in terms of polymer building blocks as well as D' and D, T' and T, and Q' and Q, likewise; there being many varieties of each type of building block, are all encompassed by the simple shorthand notation referred to in the reference and herewith assume the same variability with respect to composition while retaining their respective M, D, T, and Q functionality.

A preferred hydrogen containing organopolysiloxane is a linear organopolysiloxane of the formula:

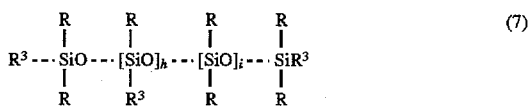
(7)

wherein R is defined as above, excluding unsaturated compounds, $R^3$ is the same as R excluding unsaturated compounds and with the addition of hydrogen, h varies from 1 to about 1000, and i varies from 5 to about 200. More preferably, h varies from 10 to about 500 and i varies from 5 to about 200.

The hydrogen containing organopolysiloxane, (D), is utilized at a concentration of anywhere from about 0.5 to 25 part by weight per 100 parts by weight (A), and preferably at a concentration of from about 0.5 to about 10 parts by weight per 100 parts by weight (A). It is desirable that in the SiH material there is at least one hydrogen atom for every vinyl group in (A) and preferably from about 1.1 to about 2.5 hydrogen atoms for every vinyl group.

Many types of platinum catalysts for this SiH olefin addition reaction are known and such platinum catalysts may be used for the reaction in the present instance. When optical clarity is required the preferred platinum catalysts are those platinum compound catalysts that are soluble in the reaction mixture. The platinum compound can be selected from those having the formula ($PtCl_2$Olefin) and H($PtCl_3$Olefin) as described in U.S. Pat. No. 3,159,601, hereby incorporated by reference. The olefin shown in the previous two formulas can be almost any type of olefin but is preferably an alkenylene having from 2 to 8 carbon atoms, a cycloalkenylene have from 5 to 7 carbon atoms or styrene. Specific olefins utilizable in the above formulas are ethylene, propylene, the various isomers of butylene, octylene, cyclopentene, cyclohexene, cycloheptene, and the like.

A further platinum containing material usable in the compositions of the present invention is the cyclopropane complex of platinum chloride described in U.S. Pat. No. 3,159,662 hereby incorporated by reference.

Further the platinum containing material can be a complex formed from chloroplatininc acid with up to 2 moles per gram of platinum of a member selected from the class consisting of alcohols, ethers, aldehydes and mixtures of the above as described in U.S. Pat. No. 3,220,972 hereby incorporated by reference.

The catalyst preferred for use with liquid injection molding compositions are described in U.S. Pat. Nos. 3,715,334; 3,775,452; and 3,814,730 to Karstedt. Additional background concerning the art may be found at J. L. Spier, "Homogeneous Catalysis of Hydrosilation by Transition Metals", in *Advances in Organometallic Chemistry*, volume 17, pages 407 through 447, F. G. A. Stone and R. West editors, published by the Academic Press (New York, 1979). Persons skilled in the art can easily determine an effective amount of platinum catalyst. Generally, an effective amount ranges from about 0.1 to 50 parts per million of the total organopolysiloxane composition.

One example utilized by current technology is the use of platinum compounds that are complexed by highly coordinating ligands such as 2,2'-bipyridyl. Pt bipyridyl exhibits good stability, i.e. there is no curing at low temperatures, however, the curing at high temperatures, e.g. 350° F., is not as fast as might be desirable. Another approach is to premix the platinum and another inhibitor such as 1-ethynyl-1-cyclohexanol. This mixture has a good low temperature stability as well as a good cure rate at 350° F. but has a poor shelf life. When an inhibitor exhibits poor shelf life, the cure rate decreases directly with increasing time of storage.

In order to obtain high tensile strength in the compositions of the present invention, it is desirable to incorporate a filler, (B), into the composition. Examples of the many fillers that may be chosen are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, and the like.

The preferred fillers that should be utilized in the composition of the present invention are either a fumed silica or a precipitated silica that has been surface treated. In one method of surface treatment, the fumed silica or precipitated silica is exposed to cyclic organopolysiloxanes under heat and pressure. An additional method of treating fillers is one in which the silica is exposed to siloxanes or silanes in the presence of an amine compound.

A particularly preferred method of surface treating silica fillers employs methyl silane silazane surface treating agents. Methylsilane or silazane surface treated fumed or precipitated silica fillers exhibit the property of flowing easily and also do not increase the low viscosity of the uncured liquid precursor silicone composition. After curing, silazane treated silicas impart an improved tear strength to the cured elastomer. Combining the silazane treatment with composition (A) for in situ treating seems to give the greatest improvement in physical properties. Silazanes treatments are disclosed in U.S. Pat. Nos. 3,635,743 and 3,847,848 hereby incorporated by reference.

The filler, (B), is generally utilized in a concentration of from about 5 to about 70 parts, preferably 15 to 50 parts filler for each 100 parts by weight of (A). The preferred filler is silazane treated fumed silica or mixtures of silazane treated fumed silica with silazane treated precipitated silica. This latter mixture is particularly preferred containing a weight ratio of fumed silica to precipitated silica of about 25/1 to about 1/1 and preferably from about 10/1 to about 5/1.

Hydroxy containing organopolysiloxane fluid, (E), may be added to extend the shelf life of the liquid injection molding organopolysiloxane composition. Where silazane treated precipitated silica filler is present in the composition, the hydroxy containing organopolysiloxane fluid or resin may be added in conjunction with the precipitated silica filler to obtain extended shelf life and mold release. Suitable hydroxy containing organopolysiloxane fluid has a viscosity of from about 5 to about 100 centipoise at 25° C. and preferably from about 20 to 50 centipoise. These fluids may be represented by the formula:

$$R_j(OH)_k SiO_{(4-j-k)/2} \qquad (8)$$

where R is defined as above, j may range from 0 to about 3, preferably 0.5 to about 2.0, k ranges from 0.005 to about 2, and the sum of j and k ranges from about 0.8 to about 3.0. The hydroxy substitution on the organopolysiloxane fluid or resin is primarily a terminal hydroxy substitution.

To obtain mold release properties employing a combination of silazane treated silica and composition (E), or to obtain extended shelf-life upon the addition of (E) alone, there should be present in composition (B) at least about 2 parts by weight silazane treated silica for each 100 parts by weight of (A) and there should be present as composition (E) from about 1 to about 5 parts by weight for each 100 parts by weight (A).

The ingredients present in composition (C), component I, may be packaged separately from the ingredients present in composition (D), component II, until the time of cure. Compositions (A), (B), (E), and additives may be divided between either component or wholly added to one component. Premature reactions are avoided in this manner during storage and transport. When it is desired to form the cured silicone rubber composition, the two components are mixed into each other and the composition is allowed to cure. A fairly general practice is to formulate inhibitors such that the cure rates will allow storage of the resin within a liquid injection molding apparatus over short periods of time such as a weekend without the curable composition curing during storage.

Traditionally liquid injection molding systems have two components, a first component that contains a platinum containing catalyst, and a second component that contains a hydride and an inhibitor. The two components are mixed in a static mixer just prior to use in injection molding. Injection molding cavity temperatures are typically 300° F. or more. The primary function of the liquid injection molding inhibitor is to prevent curing of the molding resin until the mold is filled and thereafter, the mold being filled, to allow a rapid cure to ensure short cycle times. The two components may be injected molded directly or dissolved in solvents for application as a film or coating.

In injection molding, the mixing barrel and shot chamber must be cool in order to prevent premature cure. The mold temperature generally varies from about 150° F. to about 500° F. Pigments, thixotropic agents, thermal stabilizers, and the like may be added according to the teachings in the art. It is particularly desirable to add inhibitors in order to obtain a reasonable work life in the catalyzed material. Suitable inhibitors are taught in U.S. Pat. No. 4,256,870 hereby incorporated by reference. One of the most significant problems present in the existing art is the limitation on article size and weight imposed by the kinetics of the catalyzation and the thermochemistry of the injection molding process. These two parameters presently interact to liquid injection limit the size of injection molded silicone rubber articles of manufacture.

U.S. Pat. No. 3,445,420, the teachings of which are hereby incorporated by reference, discloses and claims curable compositions comprising organopolysiloxanes and acetylenic compounds having a boiling point of at least 25° C. where the acetylenic compound has at least one acetylenic moiety contained within the structural framework of the molecule. Although the use of the acetylenic compounds disclosed and claimed in the '420 patent is well-known in the art, practice of the invention represented by the '420 patent and related inventions has not enabled the liquid injection molding of larger molded articles as contrasted with the present invention.

The manner in which the present invention improves upon the prior art is in the properties of the cured liquid injection molding compounds. When these curable compounds are co-molded with a substrate and cured they form a good bond to the substrate. However, prior art compositions that did not include the additive compounds of the present invention would exhibit a contact adhesion or self-bonding of the cured composition to another substrate surface with which it came into contact. Adding the compounds of the present invention to liquid injection molding compositions allows the practitioner to control the secondary adhesive properties of co-molded composites by reducing the self-bonding forces. The quantity of inhibitor compound present ranges from about 0.1 to about 6 weight percent, preferably from about 0.5 to about 6 weight percent, and more preferably from about 0.5 to about 4 weight percent.

When reduced self-bonding is desired in a curable composition, the compositions of the present invention are particularly useful for manufacturing seals, connectors, gaskets, vibration dampeners, and the like.

EXPERIMENTAL

Base Liquid Injection Molding Composition

A base liquid injection molding composition consisting of the following components was prepared having the following composition:

1) 69.25 wt. % of a 40,000 cps vinyl stopped polydimethylsiloxane,
2) 19.80 wt. % of a treated fumed silica filler having a surface area of 200 m²/g (this surface area may vary from about 50 to 450 m²/g),
3) 4.35 wt. % of a 500 cps monovinyl stopped polydimethylsiloxane,
4) 4.35 wt. % of a 500 cps polyvinylmethylsiloxane polydimethylsiloxane copolymer,
5) 0.02 wt. % of a Pt hydrosilylation catalyst,
6) 1.80 wt. % of a polyhydridomethylsiloxane polydimethylsiloxane copolymer, having a hydride content of 0.86 wt. % hydrogen and a viscosity of 50 cps,
7) 0.535 wt. % of a fumarate/maleate adhesion promoter,
8) 0.053 wt. % of 3,5-dimethyl-1-hexyn-3-ol.

To this formulation was added varying amounts of materials selected as possible candidate materials to inhibit post-cure adhesion contact.

The candidate materials evaluated and found to be successful were:

1) phenyl fluids, i.e. silicones having the general formula: MDD'M, where $M=(R^1)_3Si$ with $R^1$ selected from the group of one to twelve carbon atom hydrocarbon radicals, $D=R^1R^2SiO_{2/2}$ with $R^1$ as previously defined and $R^2$ selected from the group of one to twelve carbon hydrocarbon radicals, and $D'=R^1ArSiO_{2/2}$ with $R^1$ as previously defined and Ar selected from the group of 6 to 20 carbon atom aromatic hydrocarbon radicals;

2) titanate esters, i.e. hydrocarbyloxy titanates of the formula:

$Ti(OR^4)_4$ where $R^4$ is selected from the group of 1 to 20 carbon atom hydrocarbon radicals which includes alkyl radicals, aryl radicals, and alkylaryl radicals, it is to be noted that the mixed esters where each of the $R^4$ groups are selected from the possible substituents are included in this definition; and 3) silicate esters of the formula:

$ArSi(OR^4)_3$, where Ar and $R^4$ are as previously defined. Specific examples used were: 1) a phenyl fluid (PhF)where the aromatic group was a phenyl group, and all the various hydrocarbon substituents R* were methyl, having a viscosity of 175 centipoise, 2) tetrabutyltitanate (TBT), and 3) phenyl-trimethoxy-silane (PTS).

These compounds were added to the base liquid injection molding composition in varying amounts, the composition molded against three different substrates and the contact adhesion measured between the substrate that was co-molded and the liquid injection molding formulation and between the co-molded composite and a second additional substrate where the post-cure contact adhesion between the cured liquid injection molded composition and the second substrate was evaluated. Maximizing adhesion between the curable composition and the first substrate and minimizing adhesion between the cured composition and the second substrate is the desired balance in properties. Table 1 summarizes the physical properties of the cured compositions containing the various self-bonding inhibitors (alternatively cured contact adhesion inhibitors); Table 2 summarizes the adhesive bonding properties of these same compositions when molded and cured against a first substrate; and Table 3 summarizes the contact adhesive properties of these materials when they are molded and cured against a first substrate and then clamped against a second substrate and heated for a period of 72 hours at 125° C.

TABLE 1

Physical Properties of Liquid Injection Molding Compositions Containing Self-Bonding Inhibitors

| Additive | Control | PhF | PhF | TBT | PTS | PTS |
|---|---|---|---|---|---|---|
| Quantity Added; Wt. % | 0 | 2 | 4 | 0.5 | 0.5 | 2 |
| Physical Properties | | | | | | |
| Tensile | 736 | 704 | 713 | 715 | 740 | 1108 |
| 100% Modulus | 143 | 158 | 157 | 145 | 159 | 163 |
| Elongation, % | 460 | 410 | 442 | 495 | 421 | 645 |
| Hardness | 40 | 41 | 41 | 40 | 41 | 41 |
| Tear Die B | 195 | 89 | 166 | 218 | 213 | 199 |

Note: All of the above formulations had a specific gravity of 1.10 g/cc

TABLE 2

Adhesive Properties of Cured Liquid Injection Molded Compositions - Adhesion to Co-Molded Substrate

| Additive | Control | PhF | PhF | TBT | PTS | PTS |
|---|---|---|---|---|---|---|
| Quantity Added; Wt. % | 0 | 2 | 4 | 0.5 | 0.5 | 2 |
| Substrate adhesive strength, ppi | | | | | | |
| Glass-filled Valox ® | 200+ | 200+ | 200+ | 200+ | 200+ | 200+ |
| Aluminum | 200+ | 200+ | 200+ | 200+ | 200+ | 200+ |
| Stainless steel | 200+ | 200+ | 200+ | 200+ | 200+ | 200+ |

TABLE 3

Adhesive Properties of Cured Liquid Injected Molded Compositions - Adhesion to Secondary Substrate

| Additive | Control | PhF | PhF | TBT | PTS | PTS |
|---|---|---|---|---|---|---|
| Quantity Added; Wt. % | 0 | 2 | 4 | 0.5 | 0.5 | 2 |
| Substrate adhesive strength, ppi | | | | | | |

TABLE 3-continued

Adhesive Properties of Cured Liquid Injected Molded Compositions - Adhesion to Secondary Substrate

| Additive | Control | PhF | PhF | TBT | PTS | PTS |
|---|---|---|---|---|---|---|
| Glass-filled Valox ® | 95 | 16 | 9 | 18 | 15 | 20 |
| Aluminum | 70 | 40 | 30 | 35 | 50 | 30 |
| Stainless steel | 40 | 16 | 18 | 30 | 18 | 20 |

The foregoing comparisons indicate that liquid injection molding compositions either with or without the self-bonding inhibitors form strong bonds to substrates with which they are co-molded. Absent the self-bonding inhibitor compounds of the present invention, the cured composition will self-bond to the same substrate, albeit at a somewhat lower level of force. The addition of the self-bonding inhibitor compounds to the liquid injection molding compositions, does not appreciably reduce the bonding to the co-molded substrate. However, addition of the self-bonding inhibitor compounds of the present invention does reduce the contact adhesion of the cured composition to a second substrate, which is the purpose of adding the compounds to the composition.

We claim:

1. An improved addition curable silicone composition consisting essentially of an adhesive addition curable silicone rubber composition and a self-bonding inhibitor compound selected from the group consisting of:

titanate esters of the formula:

Ti(OR$^4$)$_4$ where R$^4$ is a hydrocarbon radical having 1 to 20 carbon atoms selected from the group consisting of alkyl radicals, aryl radicals, and alkylaryl radicals, where each of the four R$^4$ groups may be independently selected; and silicate esters of the formula:

ArSi(OR$^4$)$_3$, where Ar and R$^4$ are as previously defined.

2. The composition of claim 1 where the self-bonding inhibitor compound is the titanate ester.

3. The composition of claim 1 where the self-bonding compound is the silicate ester.

4. The composition of claim 1 where the self-bonding inhibitor compound is present in an amount ranging from about 0.1 weight percent to about 6 weight percent of the final composition.

5. The composition of claim 1 where the self-binding inhibitor compound is present in an amount ranging from about 0.5 weight percent to about 6 per cent of the final composition.

6. The composition of claim 1 where the self-binding inhibitor compound is present in an amount ranging from 0.5 to about 4 weight percent of the final composition.

7. The composition of claim 2 where the titanate ester is tetrabutyl titanate.

8. The composition of claim 3 where the silicate ester is phenyltrimethoxysilane.

9. An improved addition curable silicone composition consisting essentially of an adhesive addition curable silicone rubber composition and a self-bonding inhibitor compound selected from the group consisting of:

titanate esters of the formula:

Ti(OR$^4$)$_4$ where R$^4$ is a hydrocarbon radical having 1 to 20 carbon atoms selected from the group consisting of alkyl radicals, aryl radicals, and alkylaryl radicals, where each of the four R$^4$ groups may be independently selected; and silicate esters of the formula:

ArSi(OR$^4$)$_3$, where Ar and R$^4$ are as previously defined, whereby the self-bonding peel adhesion or lap shear of the composition is reduced relative to an identical composition that does not contain the self-bonding inhibitor compound.

10. A cured composition comprising the inhibitor compound of claim 1 whereby self-bonding is reduced.

11. An article of manufacture comprising the cured composition of claim 10.

* * * * *